Jan. 27, 1948.  C. J. WAGNER  2,435,024
TRAILER HITCH
Filed Oct. 10, 1945   2 Sheets-Sheet 1

*INVENTOR.*
CARL J. WAGNER

ATTORNEYS

Jan. 27, 1948.                  C. J. WAGNER                    2,435,024
                                TRAILER HITCH
                            Filed Oct. 10, 1945            2 Sheets-Sheet 2
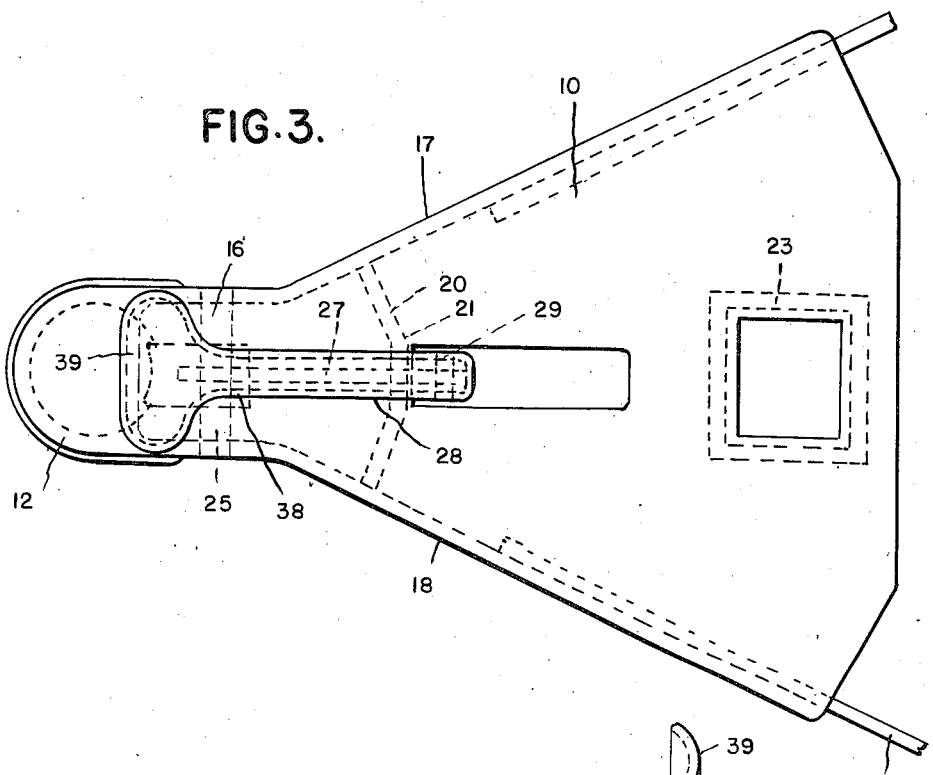
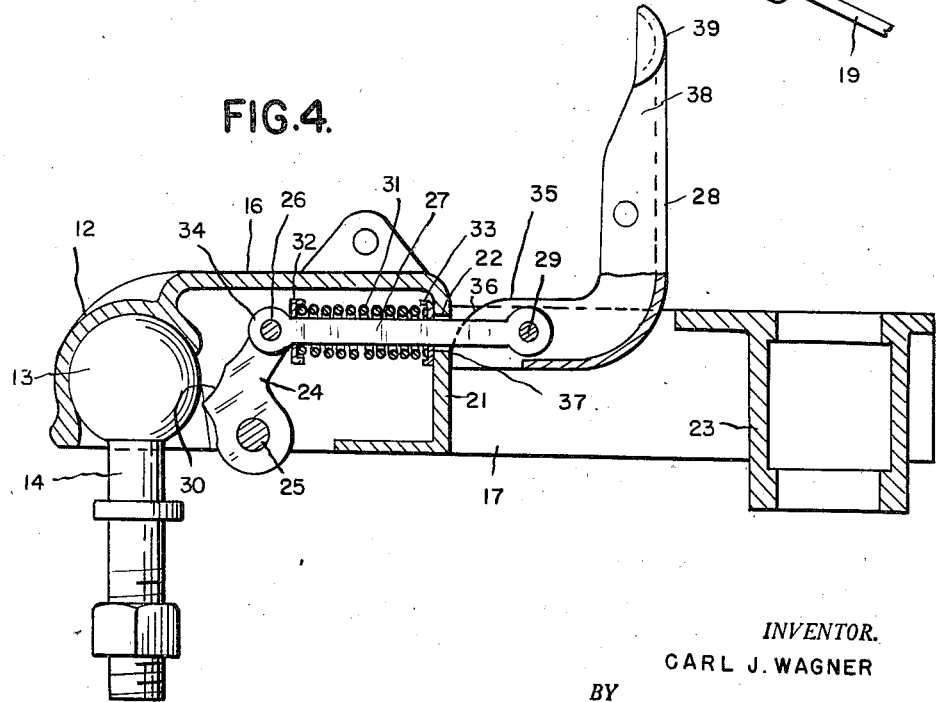
INVENTOR.
CARL J. WAGNER
BY
Whittemore Hulbert & Belknap
ATTORNEYS Patented Jan. 27, 1948

2,435,024

UNITED STATES PATENT OFFICE 2,435,024

TRAILER HITCH

Carl J. Wagner, Detroit, Mich.

Application October 10, 1945, Serial No. 621,417

3 Claims. (Cl. 280—33.17)

The invention relates to a mechanism for coupling or hitching two vehicles together, and is more particularly concerned with a device adapted to couple a towing car or tractor to a trailer.

Such a mechanism is often referred to as a tractor hitch and quite commonly is of the type where a downwardly opening socket member is attached to one vehicle, usually the trailer, and is engageable with an upwardly extending ball attached to the other vehicle.

The present invention relates to improvements in such a tractor hitch, the object being to provide a construction which is simple to operate, positive in action and readily adapted for manufacture. To this end, the invention consists in the construction hereinafter more fully described and illustrated in the accompanying drawings, wherein Figure 1 is a side view illustrating a tractor hitch between a towing vehicle and a trailer;

Figure 3 is a plan view thereof partly in section; and

Figure 4 is a view similar to Figure 2 showing the tractor hitch in released position.

Figure 1:
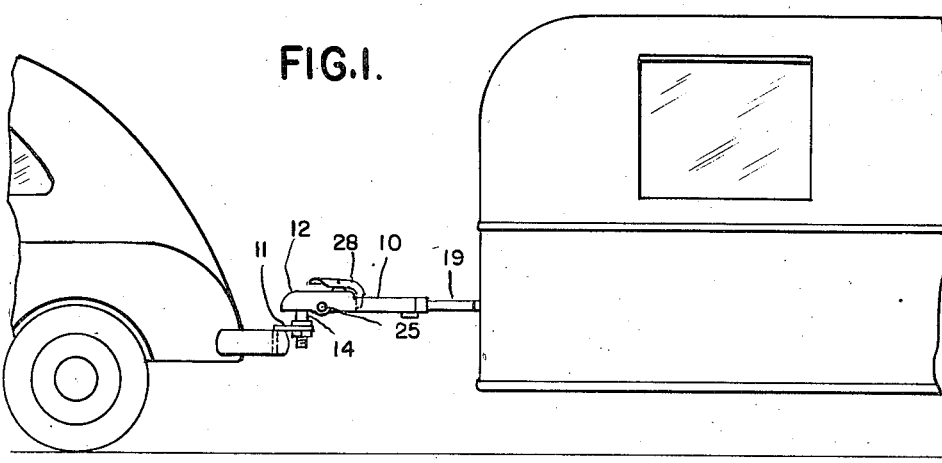

My improved tractor hitch comprises a frame or housing 10 adapted to be attached to one of the vehicles, preferably the trailer, and 11 indicates generally a drawbar adapted to be attached to the other vehicle, preferably the towing car. The housing 10 has at its forward end a semispherical socket 12 opening downwardly and adapted to receive a ball 13 which is mounted on the upwardly extending supporting member 14 of the drawbar 11. The walls forming the semispherical socket portion terminate in a plane 15 extending through the center of the semispherical socket and inclined at an angle with the horizontal plane when the tractor hitch is in its normal horizontal position. The housing 10 is preferably a steel or malleable iron casting and has a generally flat upper surface or top plate 16 from which depend the vertical side flanges 17 and 18, the latter diverging outwardly toward the rear of the device. This casting is adapted to be mounted on a V-shaped frame 19 by suitable means such as welding, the frame being itself attached to the trailer in a conventional manner.

The casting 10 is also provided with a transverse vertical wall 20 extending between the sides 17 and 18 and having a central vertical flat portion 21 provided with an aperture 22. At the rear of the casting 10 is a centrally depending boss 23 which is adapted to receive and support the vertical post of a welded supporting member such as the construction described in my patent on "Vehicle landing gear," No. 2,348,869, issued May 16, 1944.

For retaining the ball within the socket and releasing the same, I provide a lever 24 mounted on a pivot rod 25 extending between the sides 17 and 18 of the housing. The pivot rod is supported near the bottom edges of the sides 17 and 18 so that the lever extends upwardly therefrom and is pivotally connected by a pin 26 to a link or rod 27. This rod projects through the aperture 22 and is pivotally connected to a handle lever 28 by a pin 29. The lever 24 has intermediate its ends a segmental portion 30 adapted, when the lever is in its forward position, to engage the ball 13 at a location below a horizontal plane through the center of the ball. The arrangement is such that when the ball is engaged by the lever its removal from the socket is prevented and any forces tending to withdraw the ball from the socket more firmly move the lever into frictional engagement with the ball.

Surrounding the rod 27 is a coil spring 31 which is supported at opposite ends by the collars 32 and 33, the former bearing against the enlarged forward end 34 of the connecting rod and the latter abutting the inner surface of the transverse vertical wall 20. The spring 31 is normally under sufficient compression to force the lever 24 into its forward position where it engages the ball 13. The lever 28 has a substantially flat portion 35 adjacent the rearward side of the transverse wall 20 and spaced therefrom slightly when the lever 24 is in engagement with the ball 13. This flat portion 35 serves as a stop for limiting forward movement of the rod 27 when the ball 13 is removed from the socket. Below the flat portion 35 is a curved cam surface 36 of such contour that when the lever 28 is moved about its pivot 29, the cam surface engages the transverse wall 20 and moves the rod 27 rearwardly against the action of the spring 31 thereby releasing the lever 24 from engagement with the ball. The cam surface 36 terminates in a portion 37 at substantially right angles to the flat portion 35 so that when the lever 28 is moved slightly more than 90° the portion 37 engages the transverse wall 20 and the lever is frictionally held in released position and cannot be reengaged with the ball without manual operation of the lever. The lever 28 has a handle portion 38 which is curved forwardly to extend over the top plate 16 of the housing and has an enlarged handle grip 39. A rib 40 on the top plate 16 has an aperture 41 therein registering with an aperture 42 in the handle portion 38 to receive a padlock (not shown) or other suitable means for preventing unauthorized unlocking of the tractor hitch.

Figure 2:
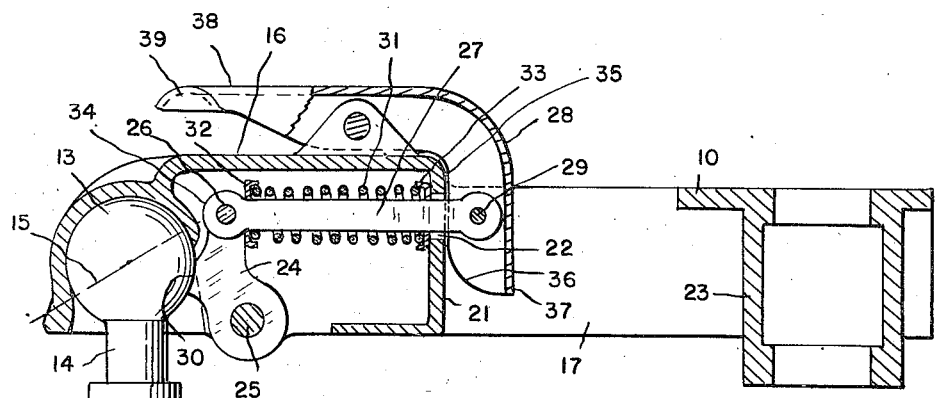
Figure 2 is an enlarged longitudinal section through the tractor hitch.

With the construction as described, the ball 13 is released from its socket member by moving the handle portion 38 from its horizontal position, as shown in Figure 2, to a vertical position, as shown in Figure 4, and in so moving the lever, the cam 36 comes into engagement with the outer surface of the transverse wall 20 and moves the rod 27 rearwardly against the action of the spring 31 thereby withdrawing the ball-engaging segment 30 of the lever 24 from the path of the ball 13 and permitting its removal from the socket. Vertical movement of the lever 28 is constrained by the walls of the aperture 22 which is only of slightly larger diameter than the connecting rod 27. For locking the tractor hitch in coupled position, the handle 39 is moved from vertical position to the horizontal position, shown in Figure 2, thus permitting the spring 31 to force lever 24 beyond dead center and engage the segment 30 with the ball 13 at a position to prevent removal of the ball from its socket.

What I claim as my invention is:

1. A tractor hitch comprising a ball, a socket member adapted to receive said ball, a lever having one end fulcrumed in said socket member and having a ball-engaging portion intermediate the ends adapted to engage said ball at a place to prevent withdrawal of the ball from said socket an abutment on said socket member, a rod connected to the other end of said lever and extending through said abutment, a coil spring surrounding said rod between said abutment and swinging end of the lever normally urging said lever into ball-engaging position, and manually operated means for moving and holding said lever in opposition to said spring.

2. A tractor hitch comprising a ball, a socket member adapted to receive said ball, a lever having one end fulcrumed in said socket member and having a ball-engaging portion intermediate the ends adapted to engage said ball at a place to prevent withdrawal of the ball from said socket, an abutment on said socket member, a rod connected to the other end of said lever and extending through said abutment, a coil spring surrounding said rod between said abutment and swinging end of the lever normally urging said lever into ball-engaging position, and a handle having a cam for retracting and holding said lever in opposition to said spring.

3. A tractor hitch comprising a frame adapted to be secured at one end to a vehicle and having a top plate with longitudinally extending sides and a transversely extending vertical wall forming an enclosure, a downwardly opening socket member for receiving a ball at the forward end of said frame, a vertically extending lever fulcrumed between said sides having its free end within said enclosure and having a segmental portion for engaging said ball to prevent withdrawal, a rod connected to the free end of said lever and projecting through and beyond said transverse wall, a releasing lever pivotally connected to the projecting portion of said rod having a handle portion extending forwardly above said top plate when said first lever is in position to engage said ball, and a cam on said lever engageable with said transverse wall and shaped to move said rod to retract said first lever upon actuation of said releasing lever about its pivotal connection to said rod.

CARL J. WAGNER.

REFERENCES CITED

The following references are of record in the file of this patent:

UNITED STATES PATENTS

| Number | Name | Date |
|---|---|---|
| 2,125,611 | Hennicke | Aug. 2, 1938 |
| 2,166,208 | Dayton | July 18, 1939 |
| 2,170,980 | Thorp et al. | Aug. 29, 1939 |